Jan. 19, 1954

C. MOTT 2,666,833

TANTALUM WELDING FIXTURE

Filed June 24, 1952

INVENTOR
CHESTER MOTT, DECEASED,
By GEORGE A. MOTT, EXECUTOR.
By: Schneider & Dressler, Attys.

Patented Jan. 19, 1954

2,666,833

UNITED STATES PATENT OFFICE 2,666,833

TANTALUM WELDING FIXTURE

Chester Mott, deceased, late of Evanston, Ill., by George A. Mott, executor, Evanston, Ill., assignor to Fansteel Metallurgical Corporation, a corporation of New York Application June 24, 1952, Serial No. 295,306

2 Claims. (Cl. 219—8)

This invention relates to a tantalum welding fixture, and while particularly adapted for use in butt welding of tantalum, the fixture forming the subject matter of this invention may be used for welding other metals and alloys.

In the copending application of Chester Mott, Serial No. 265,688, filed January 9, 1952, there is disclosed an invention relating to welding tantalum. As disclosed in said application, tantalum is not susceptible to conventional welding technique. Briefly, this is based upon the fact that tantalum has a melting point higher than all but two known metals and is chemically active and will combine with substantially every element except the inert gases when the tantalum is at a temperature above about 400° C. Because of this, successful welding of tantalum requires that the hot tantalum be protected from contamination by either gaseous or solid material.

Additionally, it has been found, as disclosed in said application, that butt welding of tantalum is complicated by the tendency of one tantalum sheet or plate to climb over the edge of the other tantalum sheet or plate. One way in which this creeping tendency may be utilized for obtaining good butt welds is, as disclosed in said application, to feed the sheets toward the weld region so that the edges to be butt welded form a slight angle. This angle is of the order of about 1 degree.

In accordance with this invention there is provided a simple but effective fixture for controlling sheets of tantalum or other material to be fed toward a welding electrode for butt welding. The fixture forming the subject matter of this invention will now be explained in connection with the drawings, wherein a simple exemplary embodiment is shown. It is understood that substantial variations in construction of the fixture will occur to those skilled in the art and such variations are within the scope of the invention as defined by the appended claims.

Referring therefore to the drawings.

Table 10 of any suitable material such as steel, for example, has an elongated channel 11 therein. Channel 11 is adapted to clear weld line 12 of sheets 13 and 14 of tantalum.

As disclosed in the copending application previously referred to, channel 11 is deep enough and wide enough and long enough so that the table material clears all parts of the tantalum which are at a temperature high enough to be contaminated by foreign solid material. Covering a portion of the length of channel 11 is housing 16 and welding means 17 of the same general construction as disclosed in the aforementioned application. In general, the housing cooperates with the table to provide a generally closed region within which an inert atmosphere of suitable gas, such as helium, may be maintained both around the weld region and around the region where hot tantalum may lie. Suitable gas inlets for inert gas may be provided as more fully disclosed and claimed in the application previously identified.

Figure 1:
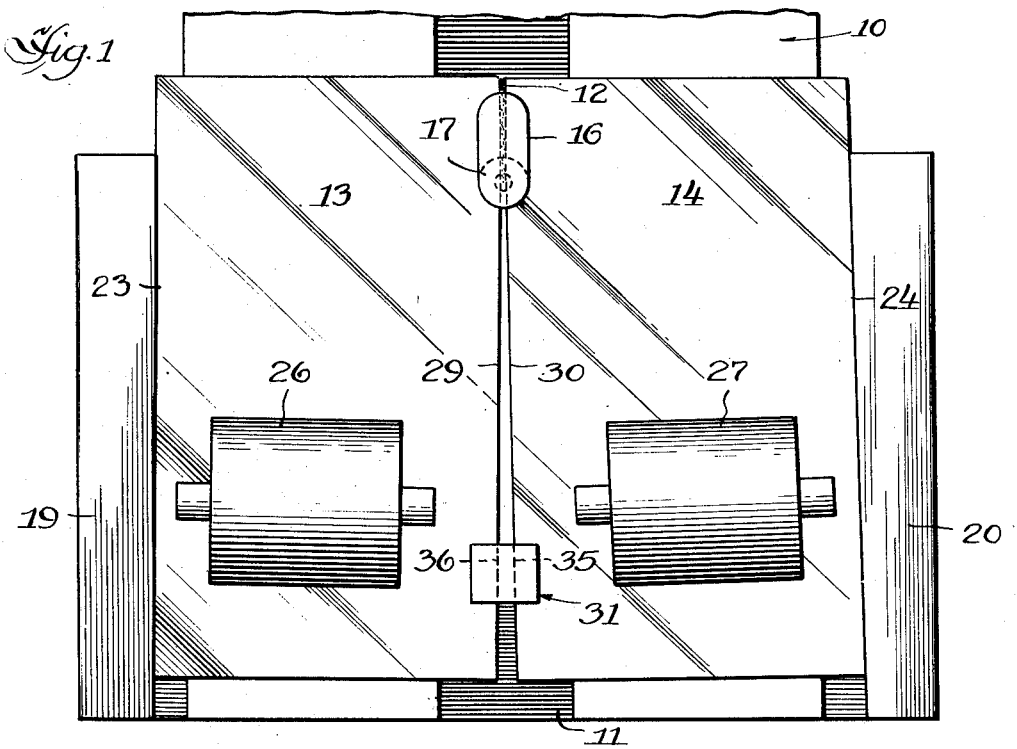
Figure 1 shows a top plan view of a tantalum welding setup, including the fixture forming the subject matter of this invention.

Table 10 (Figure 2) is provided with lateral guides 19 and 20 adjustably secured by bolts 21 and 22 to the underside of table 10. Lateral guides 19 and 20 (Fig. 1) may be adjusted to engage outer edges 23 and 24 of the tantalum sheets to be welded.

Resting on top of sheets 13 and 14 are rollers 26 and 27, suitably journaled in a superstructure and adapted to rest on or be forced over the tantalum sheets. As will be observed in Figure 1, the axes of the rollers are preferably inclined at a slight angle in a horizontal plane to each other. The angle of inclination is not critical but is preferably about 1 degree, the same as the angle between opposing edges as they are fed toward the welding region. Thus, tantalum sheets 13 and 14 have edges 29 and 30 ahead of the welding region within hood 17, these edges being spaced from each other as shown. As has been pointed out, it is essential that edges 29 and 30 make an angle of the order of about 1 degree therebetween, the edges meeting at the weld. The axes of rollers 26 and 27 are preferably horizontal and may, therefore, be perpendicular to edges 29 and 30 respectively, although departure from this condition is possible.

Figure 2:
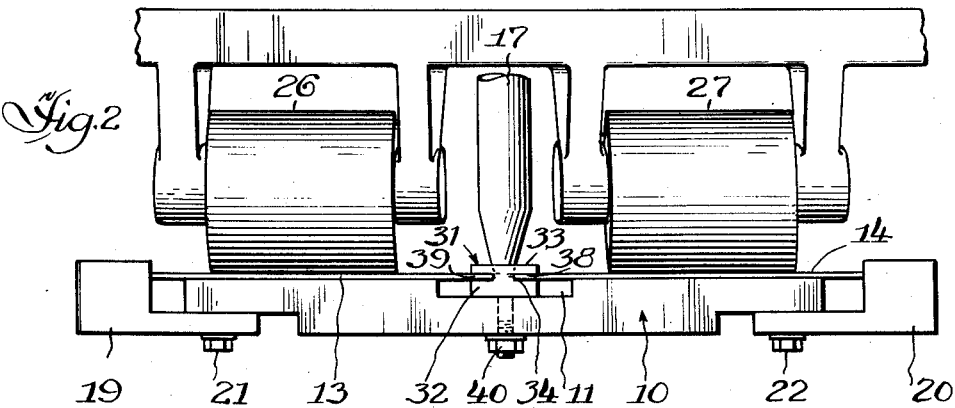
Figure 2 is a front elevation of the setup shown in Figure 1.
Figure 3:
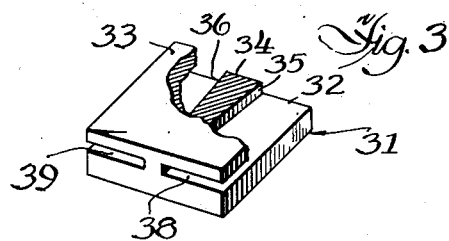
Figure 3 is a perspective view with parts broken away of the fixture shown in Figures 1 and 2.

In order to maintain the predetermined alignment between edges 29 and 30 of the tantalum sheets, fixture 31 (Fig. 3) is provided. Fixture 31 consists of base block 32 of any desired configuration. Disposed above base block 32 is top block 33 which also may be of any desired configuration. Both blocks may conveniently have a generally rectangular shape as shown. Blocks 32 and 33 are spaced from each other by island 34 extending between the opposed block faces. Island 34 has sides 35 and 36 which taper as shown, the taper being substantially about 1 degree. Thus, the island and opposed block faces provide guide slots 38 and 39 on opposite sides of the island. The fixture may be made out of a single block with slots 38 and 39 milled out. It is also possible to have island 34 separate from either block 32 or block 33, or from both of them, and have the elements making up the fixture bolted together. It is understood, of course, that the bolts holding the parts of the fixture must pass through the island so that the slots will be clear for accommodating the tantalum sheets. By having the fixture in two or three parts, a number of different island heights may be provided to accommodate varying gauges of tantalum. The fixture is rigidly attached to the table by means of bolts 40 (Fig. 2).

A fixture may be made of any desired material. In general, while iron or steel may be used, other metals or alloys or materials are preferred because the coefficient of friction between tantalum and iron is undesirably high. Thus, if a snug fit between the tantalum and fixture is desired, binding is apt to occur when the fixture has iron or steel surfaces over which the tantalum slides. Thus, a fixture may be made of glass, quartz, ceramic material, or may be made of copper, brass or aluminum bronze consisting of 95% copper and 5% aluminum. This aluminum bronze is particularly desirable for this purpose for the reason that tantalum works well in a fixture of this material and will not bind. However, other metals and alloys may be used in the manufacture of a fixture. It is not necessary that the entire fixture be of the same material or metal.

Suitable means, not shown, are provided for feeding tantalum sheets 13 and 14 forwardly from the fixture to the welding region and thence beyond the welding region. It is understood that table 10 or other support means will extend for a sufficient distance beyond the welding region, in the direction of tantalum travel and that means cooperating with the table to protect the hot weld line from contamination will be provided. Rollers 26 and 27 are preferably heavy enough so that they tend to keep the tantalum sheets down against the top of table 10. Rollers 26 and 27 may be of any suitable material. However, it is preferred to have the roller surfaces contacting the tantalum of a material such as aluminum bronze, which has a low coefficient of friction with respect to tantalum. The roller surfaces may also be of aluminum, copper, or any other material.

It is understood that sheets 13 and 14 are guided to the weld region and after welding has been initiated, continuous travel of the sheets is established for the purpose of obtaining a continuous butt weld. Guides 19 and 20 may extend a sufficiently long distance in the direction of tantalum travel so that when the tantalum sheets are first started toward the weld region, the guides will prevent the sheets from separating. Guides 19 and 20 may also be of aluminum bronze to prevent binding of the tantalum edges.

The length of the fixture in the direction of travel of tantalum need only be great enough to provide desired guiding action to the tantalum edges. Once welding has been initiated and sheets 13 and 14 have been joined, guiding forces for the tantalum edges need only be exerted at comparatively short regions lengthwise of the tantalum. Thus, each tantalum edge 29 and 30 will be supported at the weld region and at the sides of the island. If desired, more than one fixture may be used at spaced intervals. Thus, an additional fixture may be disposed between the one shown in Fig. 1 and the weld region in hood 17. Such additional fixture will have a smaller island, although the angle will be the same.

The fixture disclosed here may be used with the welding machine disclosed in the copending application of Chester Mott, Serial No. 295,307, filed on the same day as this application.

What is claimed is:

1. A fixture for use in butt welding tantalum, said fixture being of aluminum bronze and comprising top and bottom plates having flat opposed faces, a spacing portion between said plates for maintaining said opposed faces separated, said spacing portion providing transversely aligned slots extending from the front of the fixture to the back thereof, said slots extending to the sides of the fixture so that a sheet of metal may be inserted edgewise into each slot, said spacing portion tapering in width from the front of the fixture to the rear thereof, the angle of taper being about 1 degree so that two sheets may be disposed in said slots with the edges thereof guided by said spacing member at an angle of about 1 degree to each other.

2. For use in butt welding tantalum, the combination of a table having a channel therein and a fixture for guiding the edges of two tantalum sheets to be butt welded, said fixture being of aluminum bronze and comprising top and bottom plates spaced from each other and an island member between said top and bottom members for maintaining the same in spaced relation, said fixture having a front portion and a rear portion, the front portion of said fixture being furthest from the welding region, said spacing member having a tapering width, the taper being about 1 degree and adapted to accommodate the opposing edges of tantalum sheets, and means for maintaining said fixture on said table so that said island portion may guide the edges of tantalum sheets to be butt-welded.

GEORGE A. MOTT,
*Executor of the last will and testament of Chester Mott, deceased.*

References Cited in the file of this patent

UNITED STATES PATENTS

| Number | Name | Date |
|---|---|---|
| 1,854,957 | Richard | Apr. 19, 1932 |
| 1,869,351 | Lincoln | July 26, 1932 |
| 1,908,402 | Buchanan et al. | May 9, 1933 |
| 1,958,158 | Budd | May 8, 1934 |

FOREIGN PATENTS

| Number | Country | Date |
|---|---|---|
| 263,783 | Great Britain | Mar. 3, 1927 |